United States Patent [19]

Fuller

[11] 4,338,103

[45] Jul. 6, 1982

[54] SCRUBBER

[76] Inventor: Leonard B. Fuller, P.O. Box 810, Amity, Oreg. 97101

[21] Appl. No.: 219,255

[22] Filed: Dec. 22, 1980

Related U.S. Application Data

[63] Continuation of Ser. No. 74,914, Sep. 13, 1979, abandoned.

[51] Int. Cl.$^3$ .............................................. B01D 47/00
[52] U.S. Cl. ...................................... 55/259; 55/228; 261/116; 261/118
[58] Field of Search .............. 55/257 QV, 257 R, 259, 55/240, 241, 228; 261/115–118

[56] References Cited

U.S. PATENT DOCUMENTS

| | | | |
|---|---|---|---|
| 704,199 | 7/1902 | Lee | 261/115 |
| 1,112,860 | 10/1914 | Smith | 261/118 |
| 3,593,496 | 7/1971 | Merrill | 55/257 HE |
| 4,039,307 | 8/1977 | Boader | 261/117 |
| 4,212,656 | 7/1980 | Lube | 55/260 |

FOREIGN PATENT DOCUMENTS

| | | | |
|---|---|---|---|
| 503220 | 7/1930 | Fed. Rep. of Germany | 261/116 |
| 602550 | 3/1960 | Italy | 261/115 |

Primary Examiner—Bernard Nozick

Attorney, Agent, or Firm—Chernoff & Vilhauer

[57] ABSTRACT

A scrubber for removing hydrocarbons and particulate matter from the gas exhausted from a dryer or similar open-flame device is comprised of a plurality of rectangularly cross-sectioned chambers having a first predetermined cross-sectional area and interconnected to one another end-to-end along a flow axis which is perpendicular to said cross-sectional area. Each of the chambers are separated from the adjacent chamber by means of a common baffle wall and a rectangularly cross-sectioned hollow baffle tube passes through each of the baffle walls to fluidly interconnect adjacent chambers. Each baffle tube has a cross-sectional area which is at least five times less in cross-sectional area than the chambers and has a plurality of baffle plates located in it to restrict the flow of gas therethrough. The baffle plates extend across the entire vertical extent of the baffle tube but only extend over approximately ⅔ of its horizontal extent with adjacent plates being staggered between attachment to the top and bottom of the baffle tube. Spray nozzles are located in the scrubber with one being positioned at the upper end of each chamber and one being positioned at the intersection of each of the baffle plates with the top wall of the baffle tube on the upstream side of the baffle plate.

5 Claims, 2 Drawing Figures ial matter resulting from the combustion process before the gas is exhausted to the atmosphere. A typical application of this type is in the lumber industry where large natural gas fired veneer dryers are used in the production of plywood. Large volumes of heated air are used to dry sheets of veneer after they have been cut and as a result the exhaust gases from the dryers contain the undesirable exhaust products of the flame combustion as well as undesirable materials driven off from the veneer in the drying process.

SCRUBBER

This is a continuation of application Ser. No. 074,914, filed Sept. 13, 1979, now abandoned.

BACKGROUND AND SUMMARY OF INVENTION

This invention relates to scrubbers for removing hydrocarbons and particulate matter from exhaust gases.

When an open flame is used in conjunction with an industrial process, antipollution laws require that the resulting gases be cleaned of any unburned hydrocarbons and particulate matter resulting from the combustion process before the gas is exhausted to the atmosphere. A typical application of this type is in the lumber industry where large natural gas fired veneer dryers are used in the production of plywood. Large volumes of heated air are used to dry sheets of veneer after they have been cut and as a result the exhaust gases from the dryers contain the undesirable exhaust products of the flame combustion as well as undesirable materials driven off from the veneer in the drying process.

In the past, numerous attempts have been made to provide scrubbers for removing these materials from the exhaust gases emitted from equipment such as veneer dryers, however, none have proven entirely satisfactory. In addition to being extremely efficient in the removal of undesirable materials from the exhaust gas, the dryers must be capable of handling large quantities of gas while operating on a nearly continuous basis. One prior art approach is to fashion a scrubber around large volume settling chambers so that the exhaust gases are greatly decelerated in order that the undesirable materials are precipitated out. However, since such large volumes of exhaust gas are being produced, to be effective, such chambers have to be so massive as to present serious siting problems in most applications.

Another approach is to pass the air through filters of progressively smaller filtering capacity to mechanically remove the undesirable materials from the exhaust gases. However, due to the large volume of gas being cleaned, massive filters are required which are, by their very nature, expensive. In addition, unless great care is taken, filters tend to cause excessive back pressure which effects the operaion of the dryers. Also filters must be periodically cleaned which results in periods of downtime for the dryer thereby increasing its cost of operation.

Combinations of settling chambers and filters, along with more exotic filtration means, are often used to create hybrid scrubbers which are reasonably efficient in their stated objective. However, such scrubbers are quite complex and accordingly expensive to fabricate, thereby increasing the cost of the process.

The scrubber of the present invention overcomes the aformentioned shortcomings and disadvantages of the prior art scrubbers by providing a series of rectangularly cross-sectioned substantially enclosed chambers which are interconnected to each other end-to-end along an axis of flow which is perpendicular to their cross sectional area. Located between each adjacent pair of chambers is a common baffle wall having the same cross sectional area as the chambers.

Elongate baffle tubes which pass through each of the baffle walls in order to connect the adjoining chambers to one another, have cross-sectional areas which are much less than the cross-sectional areas of the chambers. The baffle tubes contain series of baffle plates which extend completely between opposed sides of the baffle tubes but extend only partially between their top and bottom surfaces. The baffle plates are alternately joined to the tops and bottoms of the baffle tubes so as to form circuitous paths therethrough. In addition the baffle tubes are staggered in the vertical direction in alternate baffle wall so that the flow of the gas through the entire scrubber is also circuitous. Spray nozzles located within each of the chambers and adjacent to each of the baffle plates in the baffle tubes spray water into the scrubber in order to dampen the gases and to wash the baffle walls and baffle plates to remove hydrocarbons and particulate matter which have become collected on them.

Drain means associated with each of the chambers collects the water from the spray nozzles and transfers it to recycling means which removes the hydrocarbons and particulate matter from the collected water so that the water can be reused. Inlets and outlets are located in the respective end chambers for passing the exhaust gases into and out of the scrubber.

Accordingly, it is a principal object of the present invention to provide a scrubber for removing hydrocarbons and particulate matter from exhaust gases which is simple of operation and inexpensive to fabricate.

It is a further object of the present invention to provide such a scrubber which is capable of handling large flow rate of exhaust gases.

It is a further object of the present invention to provide such a scrubber which operates continuously without the requirement of periodic shutdown for maintenance and cleaning.

The foregoing objectives, features and advantages of the present invention will be more readily understood upon consideration of the following detailed description of the invention taken in conjunction with the accompanying drawings.

DETAILED DESCRIPTION OF THE PREFERRED EMBODIMENT

Figure 1:
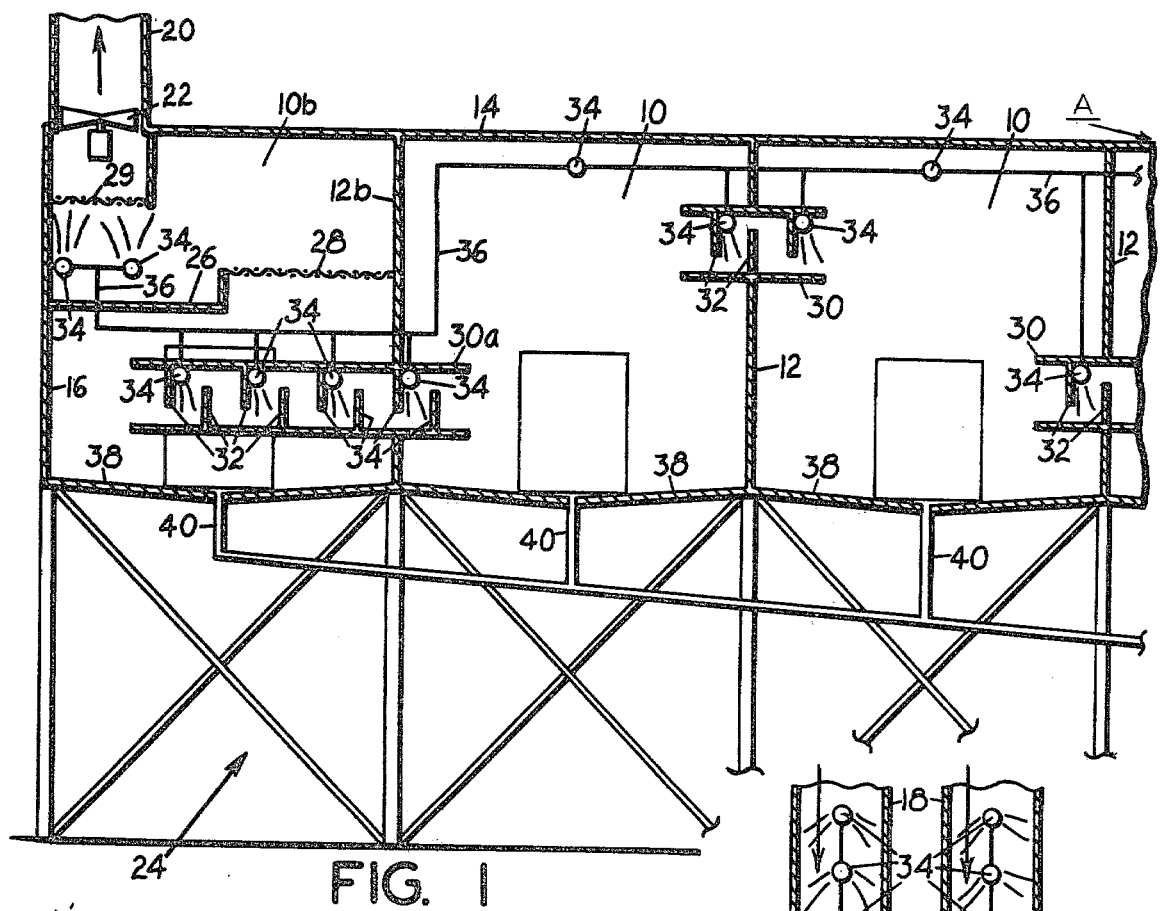
FIGS. 1 and 2 are fragmentary semi-diagrammatic sectional views respectively showing the left and right-hand portions of a scrubber embodying the features of the present invention, and when the left hand edge of FIG. 2 is fitted to the right hand edge of FIG. L, a complete semi-diagramatic sectional view of the overall scrubber according to the present invention is provided.
Figure 2:
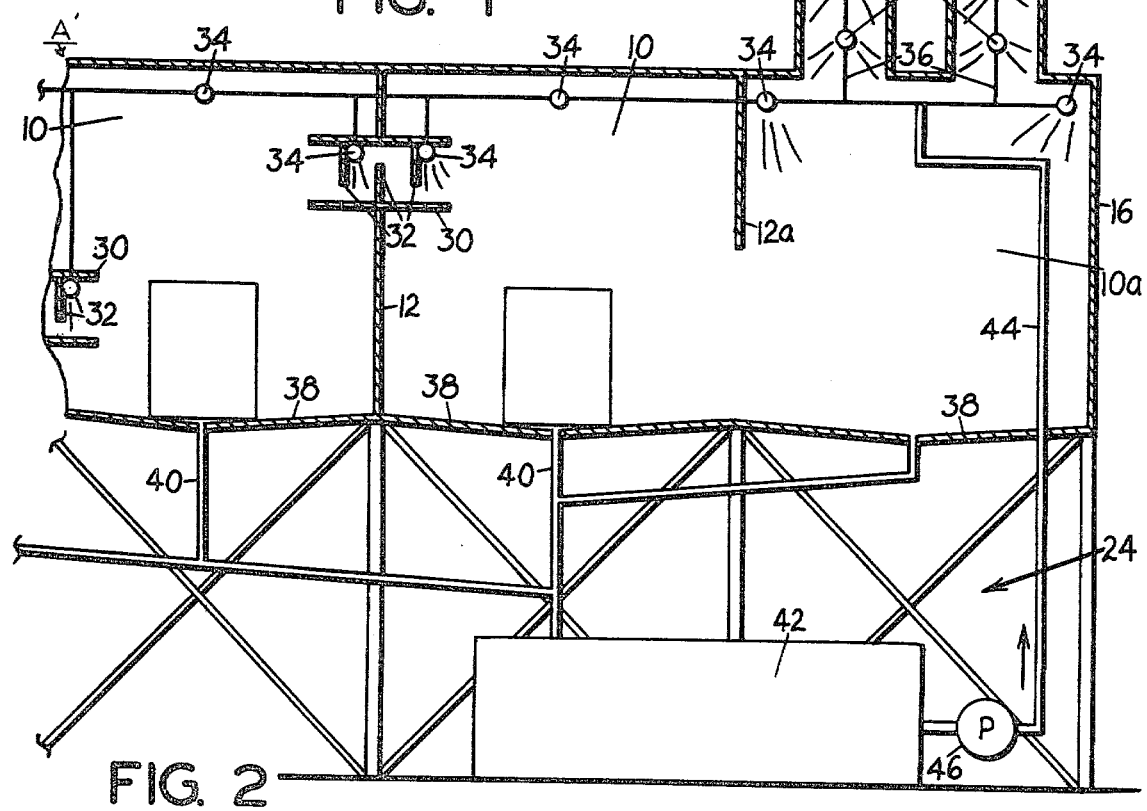

Referring to FIGS. 1 and 2 of the drawings, which when fitted together so that A at the right hand edge of FIG. 1 is abutted with A' at the left hand edge of FIG. 2 an overall view of the present invention is provided the scrubber of the present invention comprises a series of interconnected chambers 10 which are substantially enclosed. The chambers have a predetermined cross-sectional area which, in the embodiment illustrated, is square and 10 feet on each side. The chambers are aligned so that their predetermined cross-sectional areas are oriented perpendicularly to a flow axis which extends medially through the entire sequence of chambers. Separating each adjacent pair of chambers from one another is a common baffle wall 12 which is coextensive with the cross-sectional area of the chambers.

In the embodiment illustrated the scrubber is formed from an elongate rectangular tubular shell 14 which is enclosed at each end by end plates 16 and is divided into a series of end-to-end chambers 10 by baffle walls 12. The shell 14 is supported in an elevated position by means of a structural frame 24 for reasons which will be apparent later.

Unlike the remainder of the baffle walls 10, the inlet baffle wall 12a, located between the inlet end chamber 10a and the chamber adjacent to it, only extends over the upper portion of the chamber. The exit end chamber 10b is medially divided by a horizontal flow barrier comprising an impervious plate 26, which covers a portion of the chamber, and a fine mesh screen 28, which covers the remainder of the chamber.

The inlet end chamber 10a has a gas inlet, such as paired inlet pipes 18, which interconnect the scrubber with an associated piece of equipment, such as a veneer dryer (not shown). The exit chamber 10b contains a gas outlet, such as outlet pipe 20, which exhausts the scrubber through a stack (not shown). A motor-driven fan 22 located in the outlet pipe 20 serves to augment flow of the gas through the scrubber. A fine mesh screen 29 covers the lower extremity of the gas outlet pipe 20.

Located in each of the baffle walls 12, except for the inlet end baffle wall 12a, is a hollow baffle tube 30 which fluidly interconnects the chambers on each side of that baffle wall. In the embodiment illustrated the baffle tubes are square in cross section having sides of approximately 2½–3 feet in length. Accordingly, the cross-sectional area of the baffle tubes is much smaller than the cross-sectional area of the chambers. While the ratio of these areas can vary somewhat, for maximum efficiency of the scrubber it should be at least 10.

The baffle tubes are located alternately at the upper and lower portions of respective baffle plates so that flow through the scrubber assumes a generally serpentine pattern. The baffle tube in the first full baffle wall 12 after the inlet baffle wall 12a preferably is located in the upper portion of its baffle wall. In addition there preferably is an even number of chambers so that the baffle tube 30a located in the exit baffle plate 12b is positioned in the lower portion of the baffle wall.

Baffle plate means, such as rectangular baffle plates 32, are located in the baffle tubes to restrict flow through them. The baffle plates extend completely across the baffle tubes horizontally but only cover approximately ⅔ of their vertical extent. The baffle plates are alternately joined to the upper and lower surfaces of the baffle tubes so that gas passing through the baffle tubes is directed through a serpentine path.

In the baffle tubes located in the internal baffle walls 12 there are three baffle plates. However, in the exit baffle tube 30a, which interconnects the exit chamber 10b and the chamber adjacent to it there are eight baffle plates.

Spray nozzles 34, which are operably connected together by appropriate plumbing 36, are located at selected positions within the scrubber. In the embodiment shown at least one spray nozzle 34 is located centrally in the upper portion of each chamber 10. In addition a spray nozzle is located adjacent to each of the baffle plates 32 which are joined to the upper surface of the baffle tube proximate their intersection. Additional spray nozzles are located in the inlet pipes 18 and below the screen 28 in the outlet pipe 20. Other spray nozzles may be placed at desired locations in the scrubber to give suitable spray coverage as required.

In order to conserve the water which is sprayed out of the spray nozzles, the bottom wall 38 of each chamber 10 is sloped so that the center of each bottom wall is its lowest point. Collector pipes 40, interconnect openings located at the center of the bottom wall of each chamber and recycling means 42 which remove the hydrocarbons and particulate matter from the water in the conventional manner to provide clean water for reuse in the scrubber. The clean water is then pumped through a supply line 44 to the spray nozzle plumbing by means of a pump 46.

In operation, gas containing hydrocarbons and particulate matter, which is exhausted from a veneer dryer for example, is directed into the scrubber through inlet pipes 18. The inlet baffle wall 12a serves to cause the downward flow of the gas into the end chamber 12a to be reversed into upward flow in the next chamber to initiate the serpentine flow pattern which is established in the scrubber due to the alternate upper and lower locations of the baffle tubes. Accordingly, the gas flow repeatedly is deflected off of the walls of the chambers which cause a loss of the particulate matter carried by the gas. Likewise the flow of gas repeatedly is deflected by the baffle plates 32 while passing through the baffle tubes 30.

As the exhaust gas passes through the scrubber it is continually being sprayed with water from the spray nozzle 34. In addition to its effect in immediately causing removal of both hydrocarbons and particulate matter from the gas, the water droplets enclose the hydrocarbons so that they are captured by the walls and baffle plates which they strike.

A portion of the spray nozzles are located so that, in addition to dampening the gas, they serve to wash the accumulated materials from the walls and baffle plates.

In addition to the foregoing purpose, the circuitous route of the gas through the scrubber caused by the baffle plates and the location of the baffle tubes, serves to increase the flow time of the gas through the scrubber in order to increase the effect of its cleaning action.

The water from the spray nozzles flows to the bottoms 38 of the chambers where it is collected and passed through collector pipes 40 to the recycling means 42 where hydrocarbons and particulate matter is removed. The clean water from the recycling means then is re-used by directing it back to the spray nozzles through supply pipe 44 through pump 46.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A scrubber for removing hydrocarbons and particulate matter from a gas, comprising:
   (a) a plurality of substantially enclosed chambers having a predetermined first cross-sectional area and an axis of flow which is perpendicular to the plane of said first cross-sectional area;
   (b) said chambers being interconnected to one another end-to-end along said axis of flow, and having common baffle walls one of which is located between each adjacent pair of chambers, each of said baffle walls defining an opening passing therethrough each of said openings being offset with respect to the opening passing through an adjacent baffle wall;

(c) a plurality of hollow elongate baffle tubes, one passing through each of said openings in said baffle walls, each having a predetermined second cross-sectional area lying in a plane which is parallel to the plane of said first cross-sectional area and an axis of flow which is perpendicular to the plane of said second cross-sectional area;

(d) a gas inlet entering into a first end one of said chambers and a gas outlet entering into the other end one of said chambers;

(e) at least one baffle plate means located in each of said baffle tubes to restrict flow of gas therethrough;

(f) spray nozzle means placed at particular locations within said scrubber to spray said hydrocarbons and particulate matter with water to wash said hydrocarbons and particulate matter from the scrubber;

(g) wherein said first cross-sectional area is at least five times greater than said second cross-sectional area; and (h) wherein said baffle tubes are rectangular in cross-sectional area with parallel upper and lower surfaces and parallel sides, and each of said baffle tubes has at least three of said baffle plate means each comprising rectangular plates having a width which extends between said sides and a height which does not fully extend between said upper and lower surfaces, wherein adjacent plates are alternately attached to said upper and lower surfaces respectively.

2. The scrubber of claim 1 wherein the baffle tube located between said other end chamber and the chamber adjacent to it has eight baffle plates.

3. The scrubber of claim 1 wherein said baffle tubes have upstream ends which face toward said gas inlet and at least one of said spray nozzle means is located in each chamber at the upper end thereof and at least one of said spray nozzle means is located adjacent to the intersection of each of said baffle plates and the upper surface of said baffle tubes on the upstream end of said baffle plates.

4. A scrubber for removing hydrocarbons and particulate matter from a gas, comprising:

(a) a plurality of substantially enclosed chambers having a predetermined first cross-sectional area and an axis of flow which is perpendicular to the plane of said first cross-sectional area;

(b) said chambers being interconnected to one another end-to-end along said axis of flow, and having common baffle walls one of which is located between each adjacent pair of chambers, each of said baffle walls defining an opening passing therethrough each of said openings being offset with respect to the opening passing through an adjacent baffle wall;

(c) a plurality of hollow elongate baffle tubes, one passing through each of said openings in said baffle walls, each having a predetermined second cross-sectional area lying in a plane which is parallel to the plane of said first cross-sectional area and an axis of flow which is perpendicular to the plane of said second cross-sectional area;

(d) a gas inlet entering into a first end one of said chambers and a gas outlet entering into the other end one of said chambers;

(e) at least one baffle plate means located in each of said baffle tubes to restrict flow of gas therethrough;

(f) spray nozzle means placed at particular locations within said scrubber to spray said hydrocarbons and particulate matter with water to wash said hydrocarbons and particulate matter from the scrubber; and (g) a medial horizontal flow barrier dividing said other end chamber into upper and lower sections, a portion of said barrier being of a material which is improvious to said gas, and the remainder of said barrier being constructed of a fine mesh screen;

(h) wherein said first cross-sectional area is at least five times greater than said second cross-sectional area.

5. The scrubber of claim 4 including a further fine mesh screen located in said gas outlet.

* * * * *